United States Patent [19]

Katayama et al.

[11] Patent Number: 5,075,674
[45] Date of Patent: Dec. 24, 1991

[54] ACTIVE MATRIX SUBSTRATE FOR LIQUID CRYSTAL DISPLAY

[75] Inventors: Mikio Katayama; Hirohisa Tanaka; Yasunori Shimada; Hiroshi Morimoto, all of Nara, Japan

[73] Assignee: Sharp Kabushiki Kaisha, Osaka, Japan

[21] Appl. No.: 273,251

[22] Filed: Nov. 18, 1988

[30] Foreign Application Priority Data

| Nov. 19, 1987 | [JP] | Japan | 62-292465 |
| Nov. 19, 1987 | [JP] | Japan | 62-292466 |
| Nov. 19, 1987 | [JP] | Japan | 62-292467 |
| Nov. 19, 1987 | [JP] | Japan | 62-292468 |
| Nov. 19, 1987 | [JP] | Japan | 62-292469 |
| Nov. 21, 1987 | [JP] | Japan | 62-294888 |

[51] Int. Cl.$^5$ ............................................. G09G 3/36
[52] U.S. Cl. ................................. 340/719; 340/718; 340/784
[58] Field of Search ............... 340/718, 719, 765, 784; 350/332, 333, 336

[56] References Cited

U.S. PATENT DOCUMENTS

| 4,368,523 | 1/1983 | Kawate | 340/784 |
| 4,753,518 | 6/1988 | Clerc | 340/784 |
| 4,782,337 | 11/1988 | Clerc et al. | 340/784 |
| 4,818,991 | 4/1989 | Gay | 340/719 |
| 4,822,142 | 4/1989 | Yasui | 340/784 |
| 4,853,296 | 8/1989 | Fukuyoshi | 350/336 |
| 4,907,861 | 3/1990 | Muto | 350/336 |
| 4,930,874 | 6/1990 | Mitsumune et al. | 350/336 |

FOREIGN PATENT DOCUMENTS

| 58-184182 | 10/1983 | Japan . |
| 59-82769 | 5/1984 | Japan . |
| 60-12770 | 1/1985 | Japan . |
| 60-110165 | 6/1985 | Japan . |
| 60-189970 | 9/1985 | Japan . |
| 60-236260 | 11/1985 | Japan . |
| 61-51972 | 3/1986 | Japan . |
| 61-1134785 | 6/1986 | Japan . |
| 61-188967 | 8/1986 | Japan . |

Primary Examiner—Jeffery A. Brier

[57] ABSTRACT

An active matrix substrate for the liquid crystal display has a switching circuit for switching on each of picture elements which includes a corresponding gate bus line, source bus line and a switching transistor. Further, the switching circuit includes at least one redundant structure to avoid inoperativeness of the switching circuit.

17 Claims, 11 Drawing Sheets

ACTIVE MATRIX SUBSTRATE FOR LIQUID CRYSTAL DISPLAY

BACKGROUND OF THE INVENTION

1. Field of the Invention

The present invention relates to an active matrix substrate for liquid crystal display on which a switching matrix, a plurality of thin film transistors, is formed to drive individual picture elements.

2. Description of the Prior Art

Figure 23:
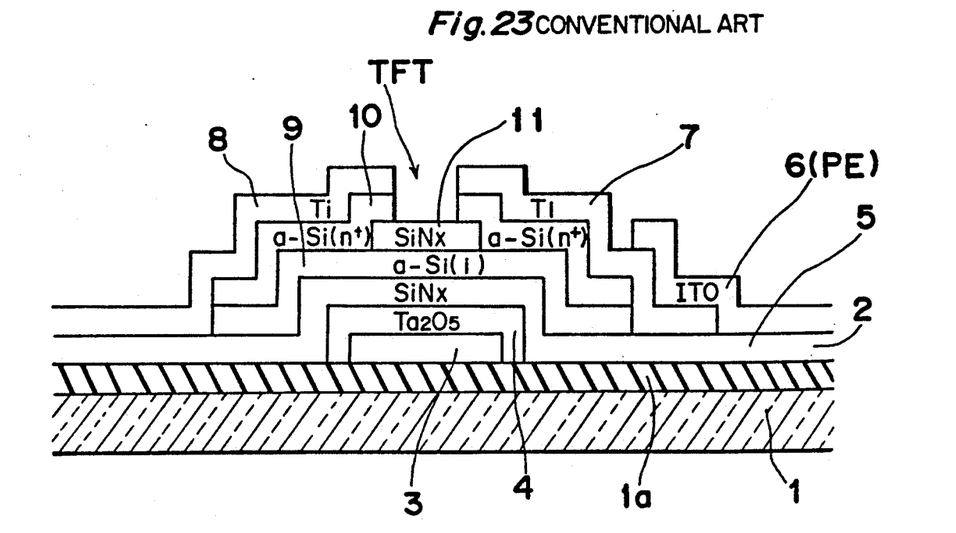
FIG. 23 is a schematic cross-sectional view along line A—A of FIG. 22.

The liquid crystal display having picture elements arranged in a matrix form, as shown in FIG. 23 schematically, is widely used. Such a the liquid crystal display panel is especially widely used for the display of an electronic apparatus, such as a personal computer of lap-top type or the like.

Figure 22:
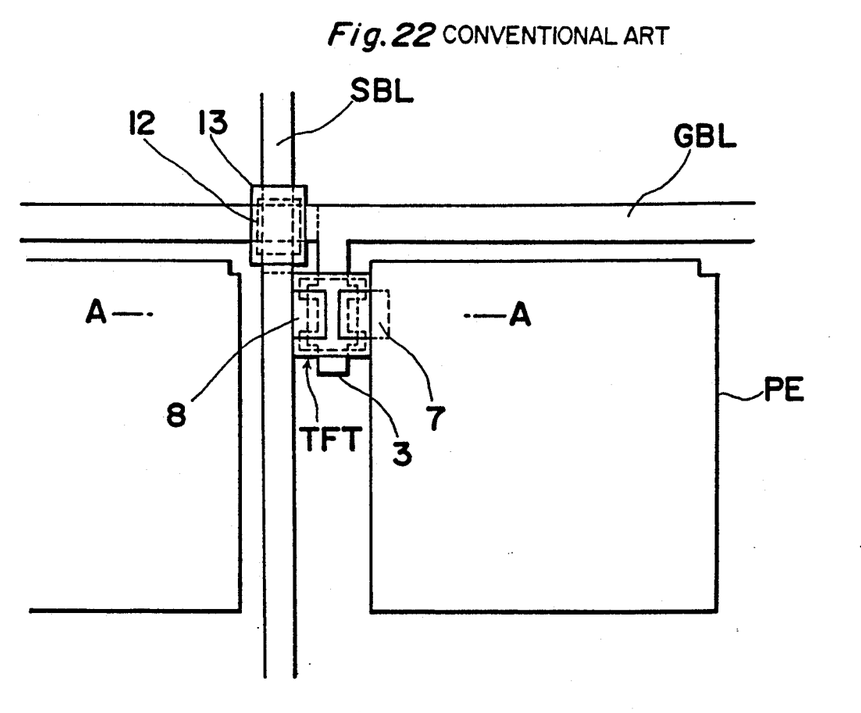
FIG. 22 is a schematic enlarged plan view showing a portion of a conventional active matrix substrate.

In a further liquid crystal display panels, so called active matrix substrate are used on which a number of thin film transistors are formed in a matrix form. As shown in FIG. 22 schematically, each thin film transistor (TFT) switches on the corresponding transparent electrode PE for a picture element when designated through both the gate and source bus lines, GBL and SBL, respectively.

FIG. 23 shows a cross-sectional view along A—A line of FIG. 22.

An insulation film 1a is formed on a glass substrate 1 and a gate electrode 3 is formed together with the gate bus line GBL on the insulation film 1a by etching Ta film.

This gate electrode 3 and the gate bus line GBL are covered with an anodic oxide film 4 of $Ta_2O_5$ and a gate insulator 5 of SiNx is formed so as to cover the whole of the insulation film 2 including the anodic oxide film 4. On the area of the gate insulator 5 covering the anodic oxide film 4, a thin film transistor TFT is formed to switch on a transparent electrode 6, for each of picture elements formed on the gate insulator 5. The thin film transistor (TFT) is formed so as to have a drain electrode 7 connected with the picture element electrode 6, a source electrode 8 connected to the source bus line SBL, and a semiconductor film 9 of amorphous silicon (a-Si) formed above the gate electrode 3. This semiconductor film 9 is connected to the drain electrode 7 and the source electrode 8 through a film 10 of amorphous silicon, and is further covered by a protection film 11.

According to this structure, TFT is switched on by applying a predetermined voltage to the gate electrode 3 through the gate bus line GBL. Therefore, a voltage applied to the source bus line SBL is applied to the picture element electrode 6 through the a-Si semiconductor film 9.

The gate bus line GBL and the source bus line SBL are insulated from each other at their crossing zone by an a-Si (i) / a-Si (n+) layer 12 and covered by an etching stopping layer 13.

In such a structure of the active matrix substrate, if a gate bus line GBL or a source bus line SBL is broken, all of picture element electrodes aligned along the broken bus line becomes inactive. This causes a line defect of an image to be displayed. Also, if a TFT is broken, the corresponding picture element is made inactive.

Conventionally, various efforts regarding the production process have been made in order to avoid these defects. However, it is impossible to avoid them completely by merely improving the production process.

SUMMARY OF THE INVENTION

One of objects of the present invention is to provide a structure of an active matrix substrate for a liquid crystal display which is capable of minimizing possible image defects such as line defect, and picture element defects and the like.

Another object of the present invention is to provide a structure of the active matrix substrate which is capable of preventing possible line defects caused by bus line breaks.

A further object of the present invention is to provide a structure of the active matrix substrate which is capable of preventing possible picture element defects due to inoperative TFTs.

BRIEF DESCRIPTION OF DRAWINGS

These and other objects and features of the present invention will become more apparent when the preferred embodiment of the present invention is described in detail with reference of accompanied drawings in that.

DETAILED DESCRIPTION OF THE PREFERRED EMBODIMENT

Figure 1:
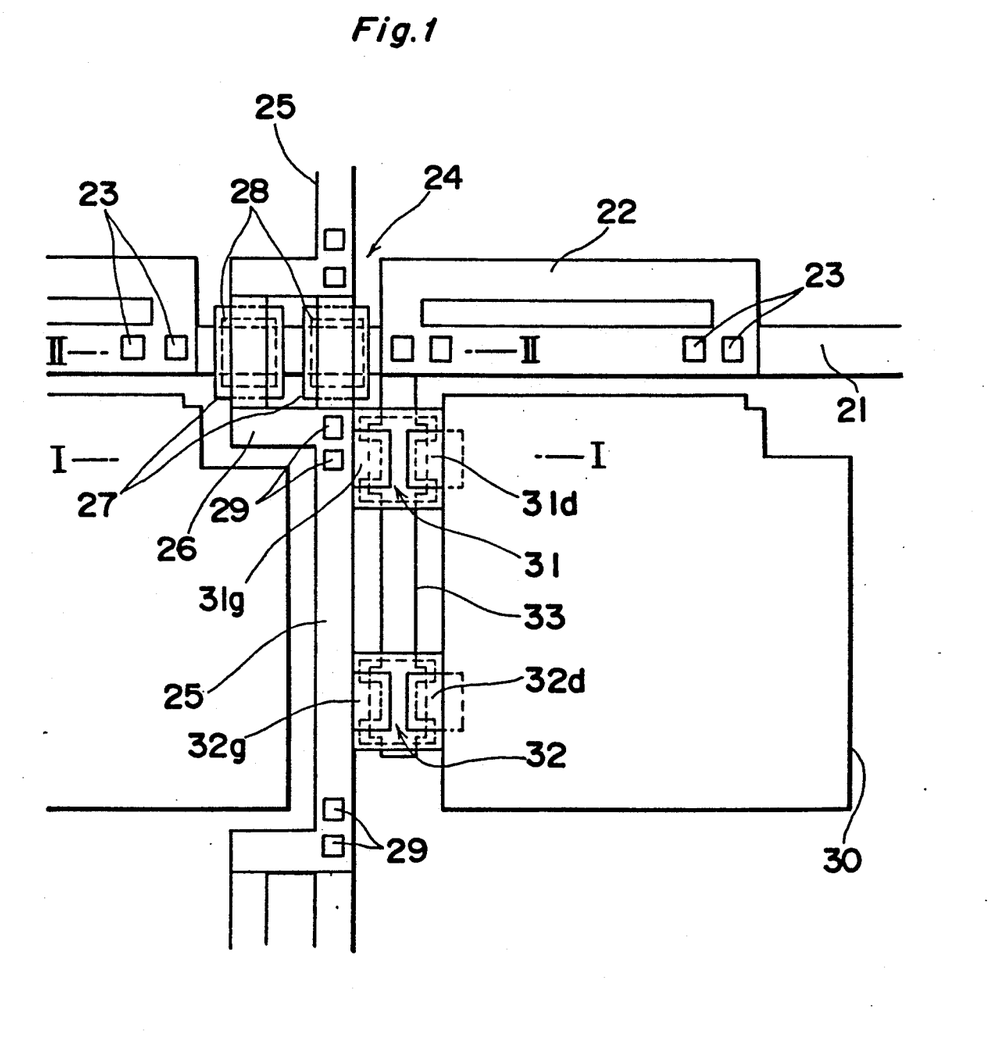
FIG. 1 is an explanative enlarged plan view of a portion of the active matrix substrate according to the present invention.

FIG. 1 shows an enlarged plan view of a portion of the active matrix substrate according to the present invention.

As shown in FIG. 1, a gate bus line 21 and a source bus line 25 are formed so as to cross at right angles with each other. A transparent picture element electrode 30 is formed in each square area defined by two adjacent bus lines and two adjacent source bus lines. Each picture element electrode 30 is switched on or off to the source bus line 25 by two thin film transistors (TFTs) 31 and 32.

These two TFTs 31 and 32 are arranged parallel on a gate electrode 33, which is formed so as to extend parallel to the source bus line 25 in an area defined between the same and the picture element electrode 30.

In the present preferred embodiment, various redundant structures are provided for the gate bus line 21, the source bus line 25 and the switching structure of each picture element electrode 30.

With respect to the gate bus line 21, there is provided a bypass bus line 22 at every picture element electrode 30 which is elongated parallel to the gate bus line 21 and terminated before a crossing zone 24 of the gate bus line source bus line 25.

Further, the part of the gate bus line 21 parallel to the bypass bus line 22 and the latter are produced as a double layered structure, as will be explained later.

With respect to the source bus line 25, a bypass bus line 26 which bypasses the crossing portion thereof with the gate bus line 21 is formed at the crossing zone 24 and the remaining portion thereof, except for the crossing zone, is made as a double layered structure.

With respect to the switching structure for each picture element electrode 30, each gate electrode 33 is formed elongated parallel to both of the source bus line 25 and the side of the picture element electrode 30. Two TFTs 31 and 32 are formed parallel on the gate electrode 33, which are able to switch on or off the picture element electrode 30 to the source bus line 25, as mentioned above.

Hereinafter, these redundant structures will be explained more concretely together with the production process of the active matrix substrate.

First Step

Figure 2:
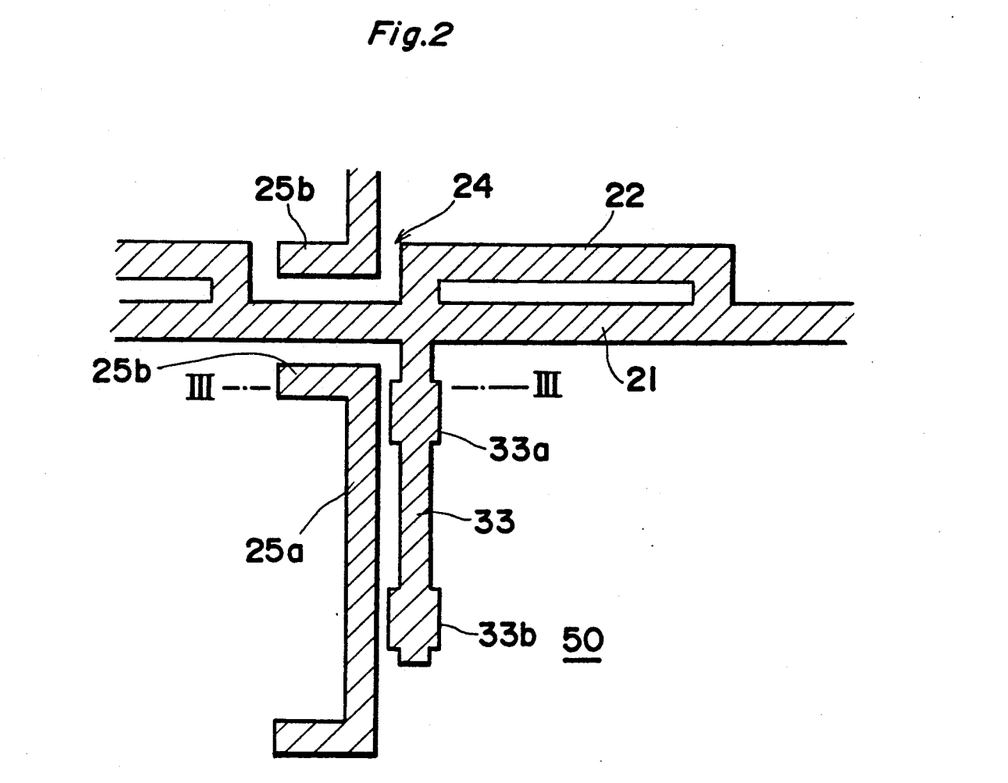
FIG. 2 is an explanative enlarged plan view for showing the first step of the production process of the active matrix substrate.
Figure 3:
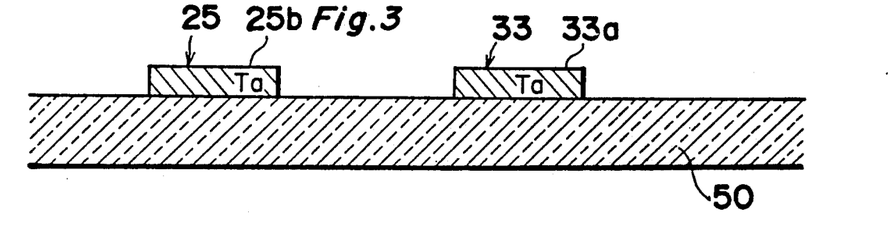
FIG. 3 is a schematic cross-sectional view along III—III line of FIG. 2.

At first, a thin film of tantalum (Ta) with a thickness of 500 to 5,000 Å is deposited on a surface of an insulated glass substrate 50.

Then, by the indicated as cross-hatched areas in FIGS. 2 and 3, individual patterns corresponding to the gate bus line 21, the bypass bus line 22 thereof, the source bus line 25 and the gate electrode 33 are formed by photoetching the tantalum film. The bypass bus line 22 is formed parallel to the gate bus line 21 and terminated prior to the crossing zone 24 in order not to increase possible leak and stray capacitance between two bus lines 21 and 25.

In this step, the pattern for forming the source bus line 25 is formed disconnected and each end 25b of a unit pattern 25a is formed to extend parallel to the gate bus line 21.

The gate electrode 33 is elongated and formed parallel to the source bus line 25. Further, two widened portions 33a and 33b are formed corresponding to TFTs 31 and 32.

Second Step

Figure 4:
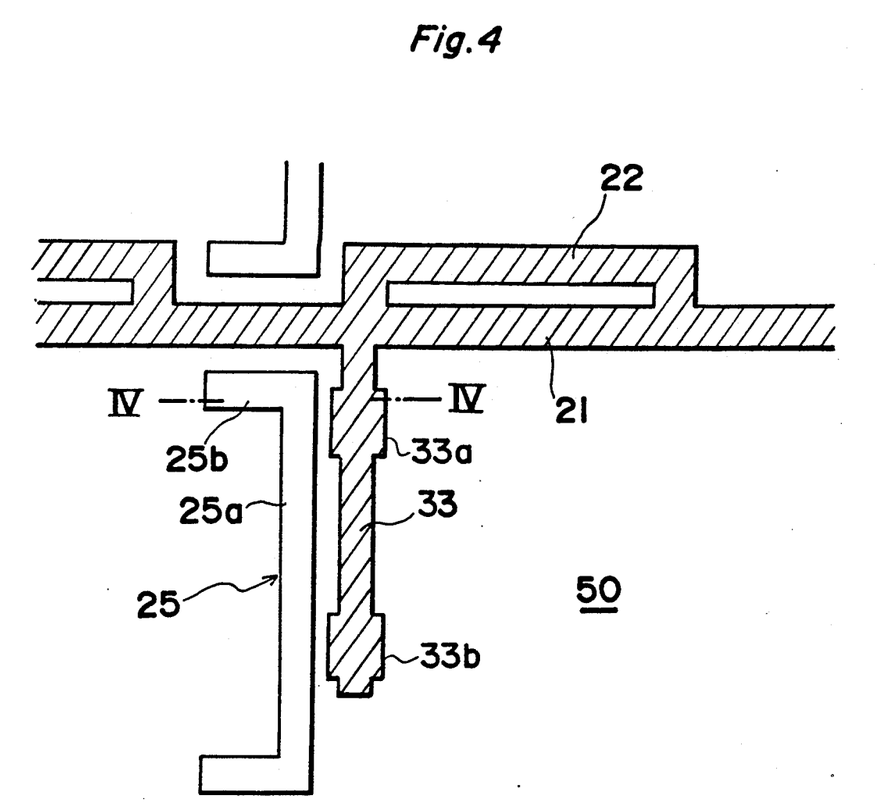
FIG. 4 is an explanative enlarged plan view for showing the second step of the production process.
Figure 5:
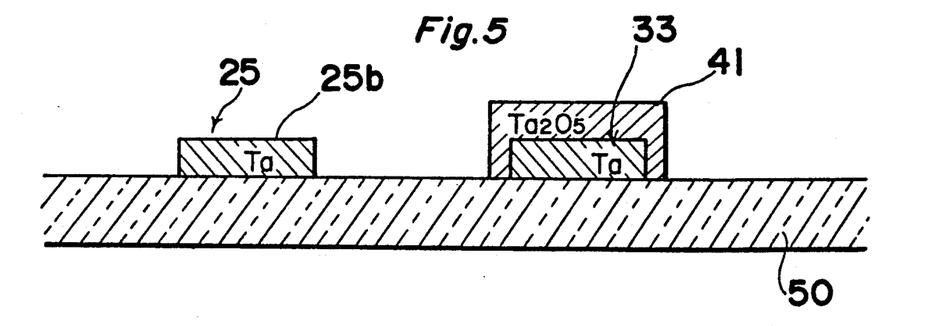
FIG. 5 is a schematic cross-sectional view along IV—IV line of FIG. 4.

The connected pattern (cross-hatched area in FIG. 4) of the gate bus line 21, the bypass bus line 22 and the gate electrode 33 is oxidized by the anodic oxidation method to form a thin insulation layer 41 of $Ta_2O_5$ with a thickness of 500 to 5,000 Å as shown in FIGS. 4 and 5.

Third Step

Figure 7:
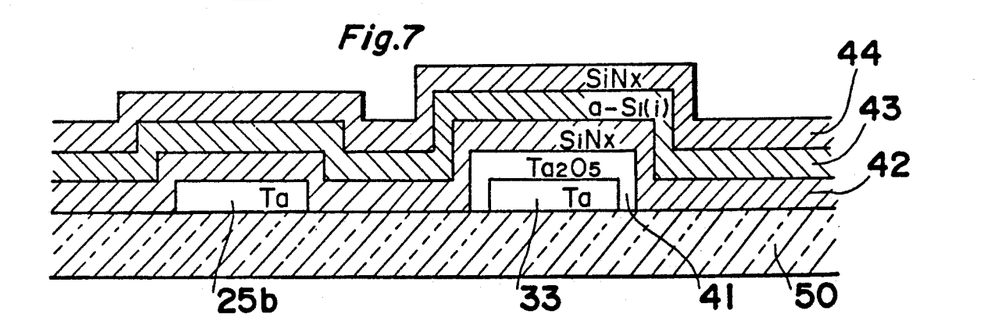
FIG. 7 is a schematic cross-sectional view along V—V line of FIG. 6.

In this step, a gate insulator 42 of SiNx with a thickness of 500 to 5,000 Å, a semiconductor layer 43 of a-Si (ni) with a thickness of 50 to 4,000 Å, and an etching stopper layer 44 with a thickness of 300 to 5,000 Å are formed by being successively stacked by a PCVD method, as shown in FIG. 7.

Figure 6:
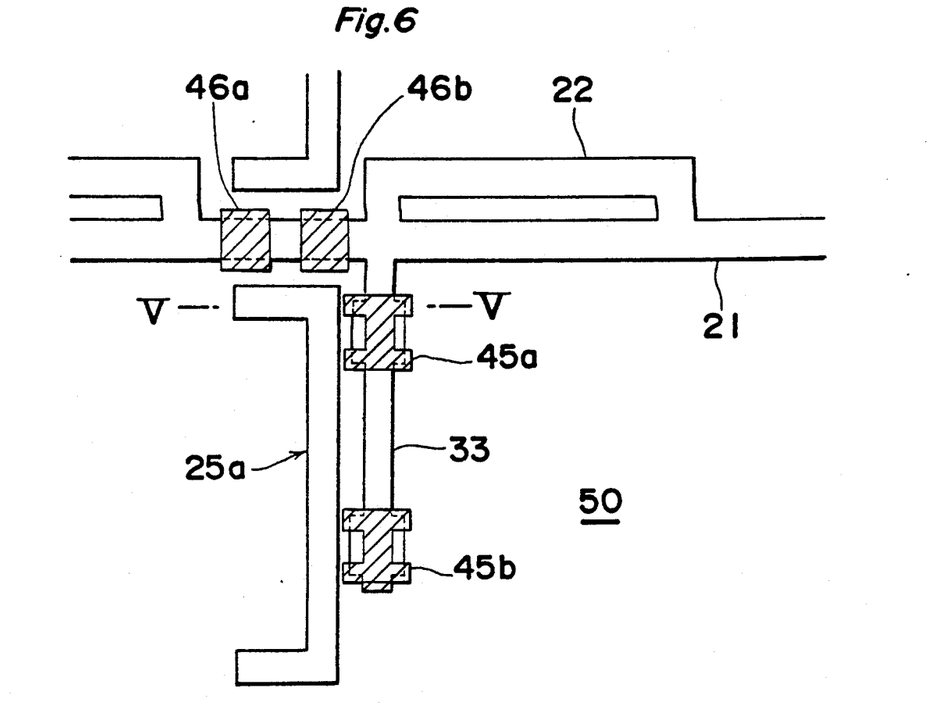
FIG. 6 is an explanative enlarged plan view for showing the third step of the production process.
Figure 8:
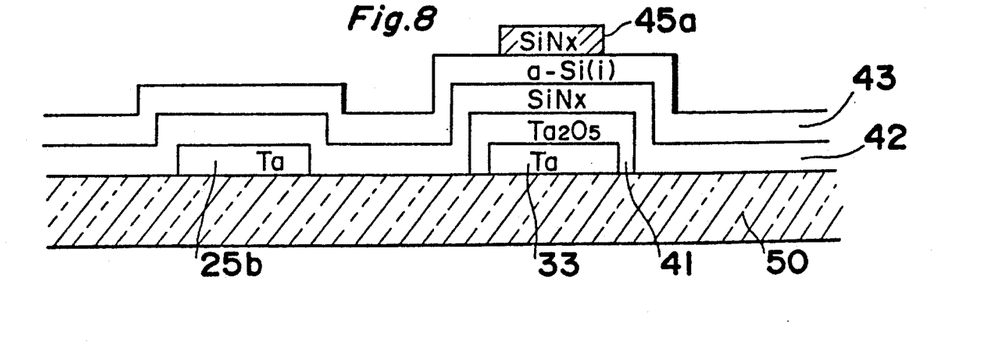
FIG. 8 is a schematic cross-sectional view along V—V line of FIG. 6 for showing the result obtained by performing the third step.

Thereafter, the uppermost layer 44 is processed by photolithography to form island portions 45a, 45b, 46a and 46b as etching stoppers, as shown in FIG. 6 and partially indicated by cross-hatched areas in FIG. 8.

The island portions 45a and 45b correspond to TFTs 31 and 32 to be formed and the other two island portions 46a and 46b are provided for covering the crossing zone of the gate bus line 21 and the source bus line 25 and the bypass bus line 26 thereof.

[Fourth Step]

Figure 9:
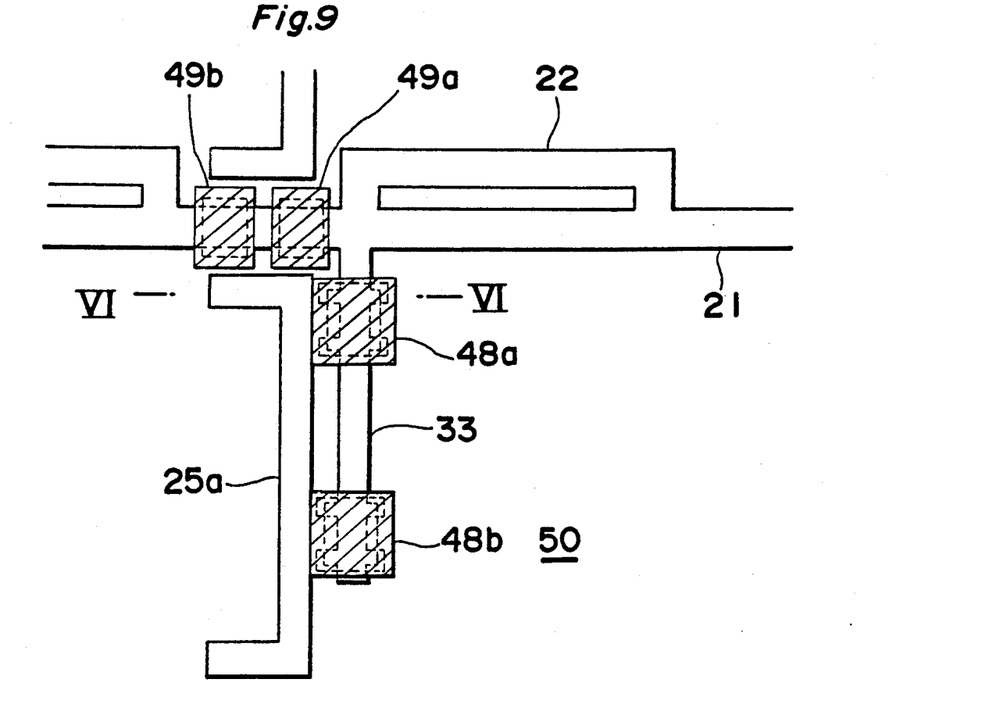
FIG. 9 is an explanative enlarged plan view for showing the fourth step of the production process.
Figure 10:
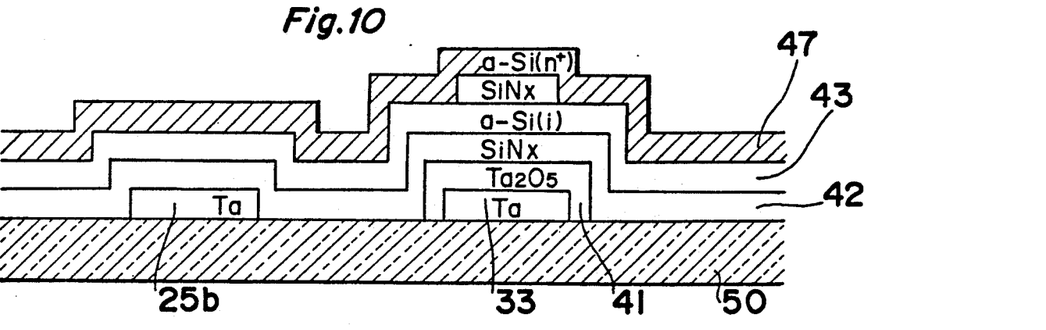
FIG. 10 is a schematic cross-sectional view along VI—VI line of FIG. 9.

Next, a thin layer 47 of a-Si (n+) with a thickness of 200 to 2,000 Å is formed by a PCVD method, as shown in FIG. 10. Then, the layer 47 is processed together with the layer 43 of a-Si(i) by photolithography so as to form island patterns 48a, 48b, 49a and 49b which cover the island portions 45a, 45b, 46a and 46b, respectively, as shown by cross-hatched areas in FIG. 9.

Figure 11:
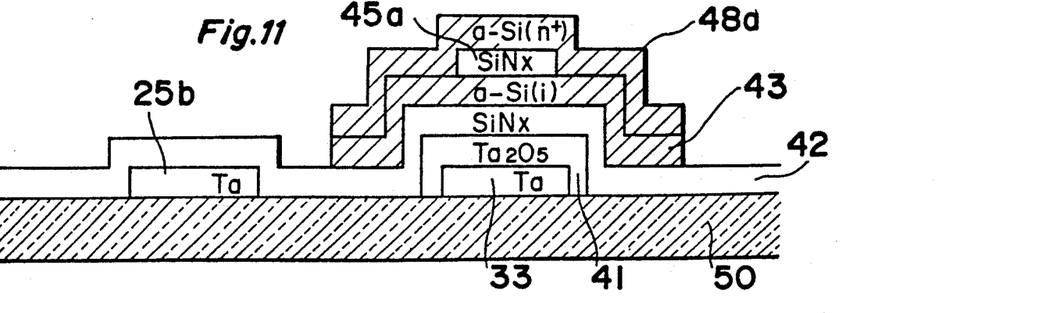
FIG. 11 is a schematic cross-sectional view along VI—VI line of FIG. 9 for showing the result obtained by performing the fourth step.

Namely, each of these island portions is comprised of double layers 47 and 43 of a-Si (n+) and a-Si(i), as shown in FIG. 11.

Fifth Step

Figure 12:
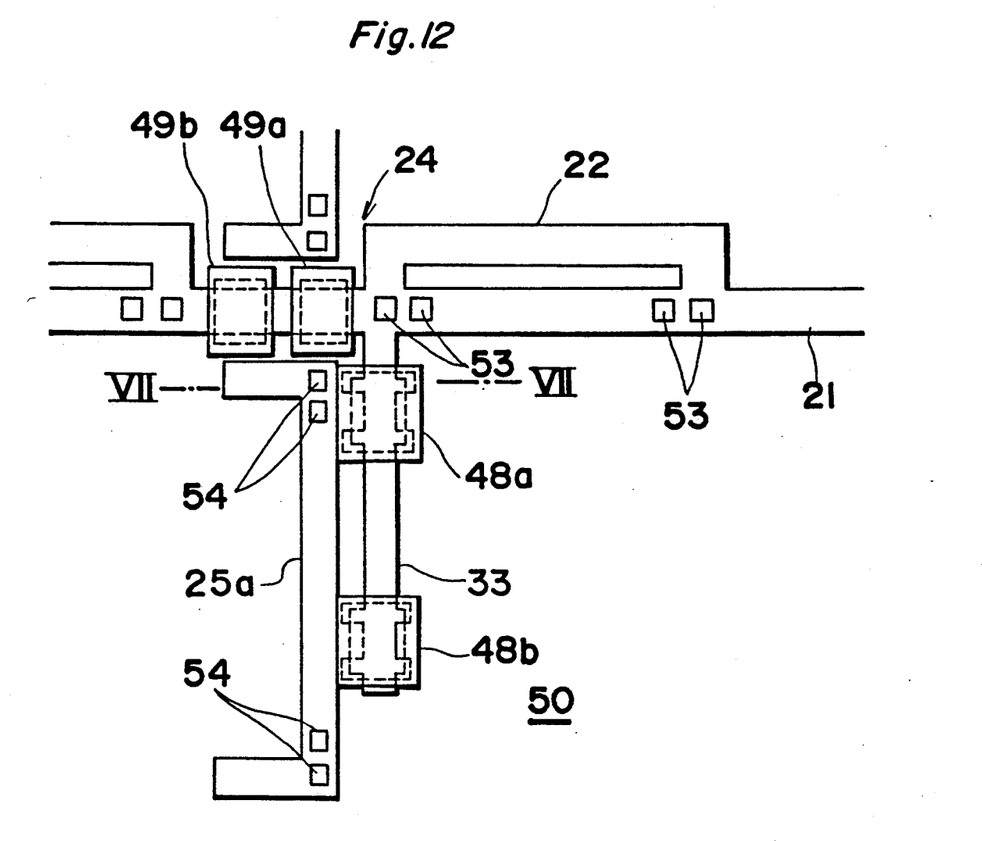
FIG. 12 is an explanative enlarged plan view for showing the fifth step of the production process.
Figure 13:
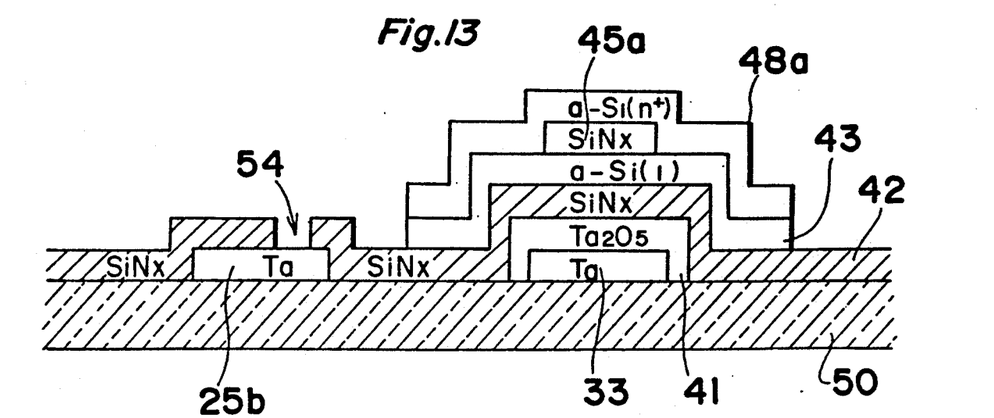
FIG. 13 is a schematic cross-sectional view along VII—VII line of FIG. 12.

As shown in FIG. 12, a pair of through holes 53 are perforated at each portion of the gate bus line 21 from which the bypass gate bus line 22 is formed. Also, a pair of through holes 54 are perforated at each end corner of the unit pattern 25a for forming the source bus line 25.

Each of these through holes 53 and 54 is formed by photoetching the insulation layer 42 of SiNx.

Each pair of through holes provides a kind of redundant structure for the through hole.

Sixth Step

Figure 15:
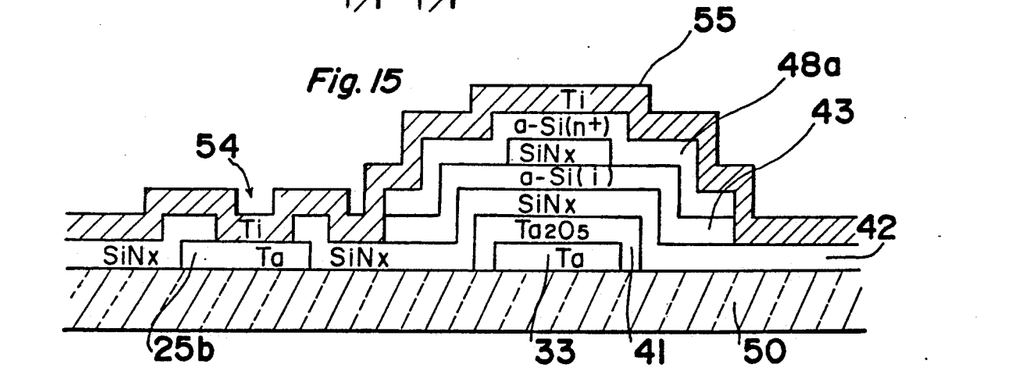
FIG. 15 is a schematic cross-sectional view along VIII—VIII line of FIG. 14.

Next, a layer 55 of titanium with a thickness of 500 to 5,000 Å is deposited by spattering so as to cover the whole area as shown in FIG. 15.

Figure 14:
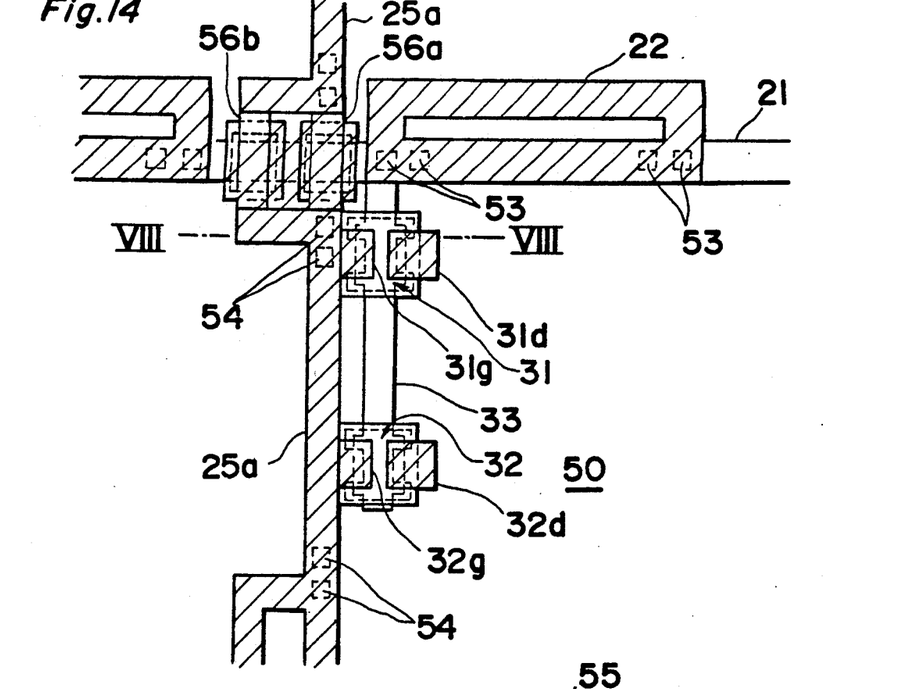
FIG. 14 is an explanative enlarged plan view for showing the sixth step of the production process.

Then, the layer 55 of Ti is removed, except for the cross-hatched areas shown in FIG. 14.

In this process, two parallel lines 56a and 56b are formed so as to connect two opposite end portions 25b of the unit patterns 25a for the source bus line 25. In other words, the first line 56a connects two adjacent unit patterns 25a to form the source bus line 25, and the second line 56b forms the bypass bus line 26 at the crossing zone 24.

Also, source electrodes 31g and 32g and drain electrodes 31d and 32d of TFTs 31 and 32 are formed, respectively.

Figure 16:
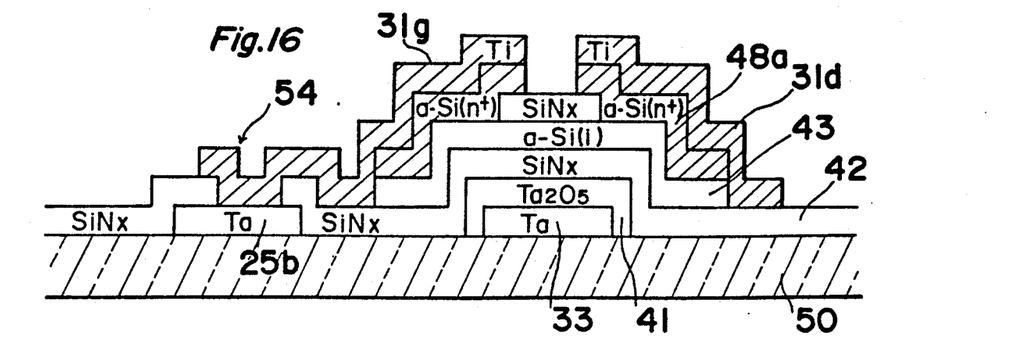
FIG. 16 is a schematic cross-sectional view along VIII—VIII line of FIG. 14 for showing the result obtained by performing the sixth step.

Further, the layers of Ti formed on the gate bus line 21 and the source bus line 25 are electrically connected, through the through holes 53 and 54, to the portions of Ta film formed in the first step, as shown in FIG. 16.

Thus, the portion of the gate bus line 21 defined between two pairs of through holes 53 is doubled. Further, the portion of the unit pattern 25a for the source bus line 25 defined between two pairs of through holes 54 is doubled.

The double bus line structure gives a kind of redundant structure to each of the gate and source bus lines 21 and 25.

Seventh Step

Figure 18:
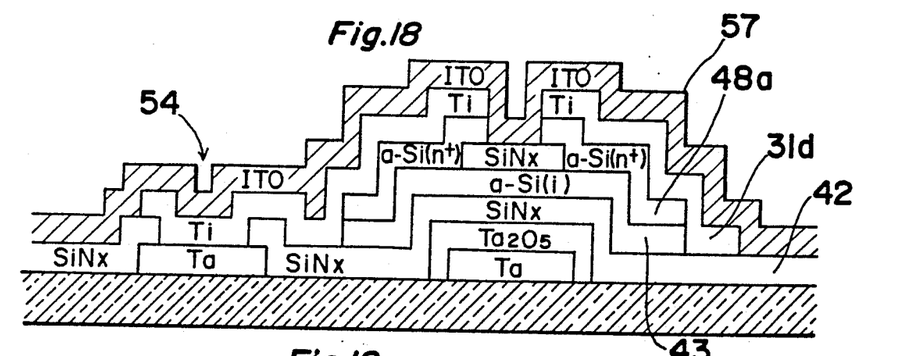
FIG. 18 is a schematic cross-sectional view along line IX—IX of FIG. 17.
Figure 19:
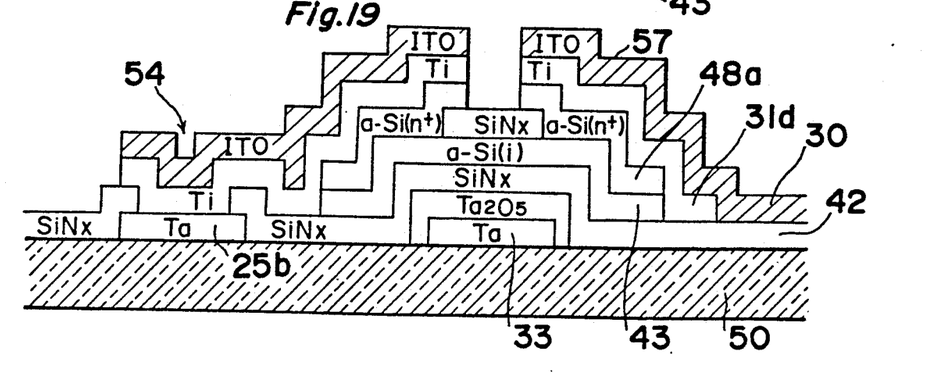
FIG. 19 is a schematic cross-sectional view along line IX—IX of FIG. 17 for showing the result obtained by performing the seventh process.

Next, indium oxide (ITO) is deposited over the whole area of the substrate to form a thin film 57 with a thickness of 300 to 3,000 Å, as shown in FIG. 18.

Figure 17:
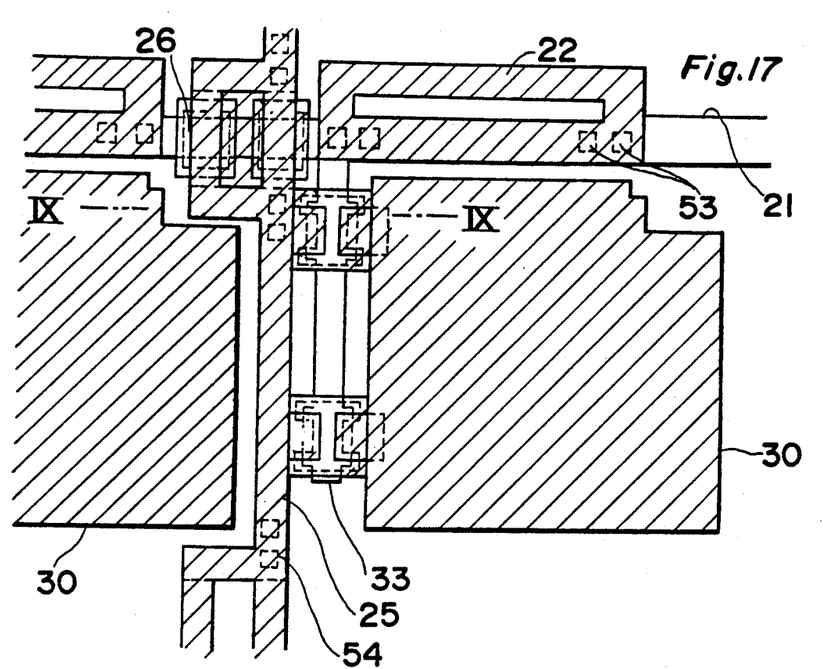
FIG. 17 is an explanative enlarged plan view for showing the seventh step of the production process.

Then, as shown by cross-hatched areas in FIG. 17, the ITO film 57 is photoetched to form individual picture element electrodes 30. Portions of the ITO film 57 remaining on respective bus lines 21 and 25 contribute to avoid possible breaks which may be caused during the patterning process in the sixth step.

Figure 20:
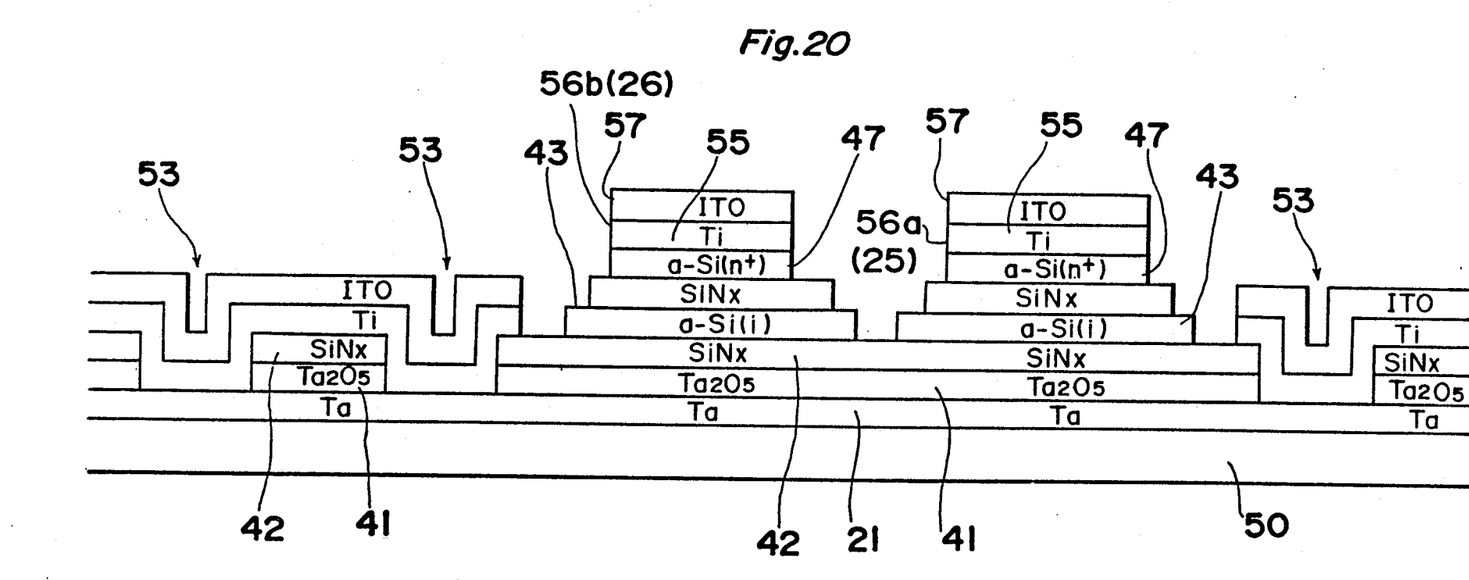
FIG. 20 is a schematic cross-sectional view along line II—II of FIG. 1.
Figure 21:
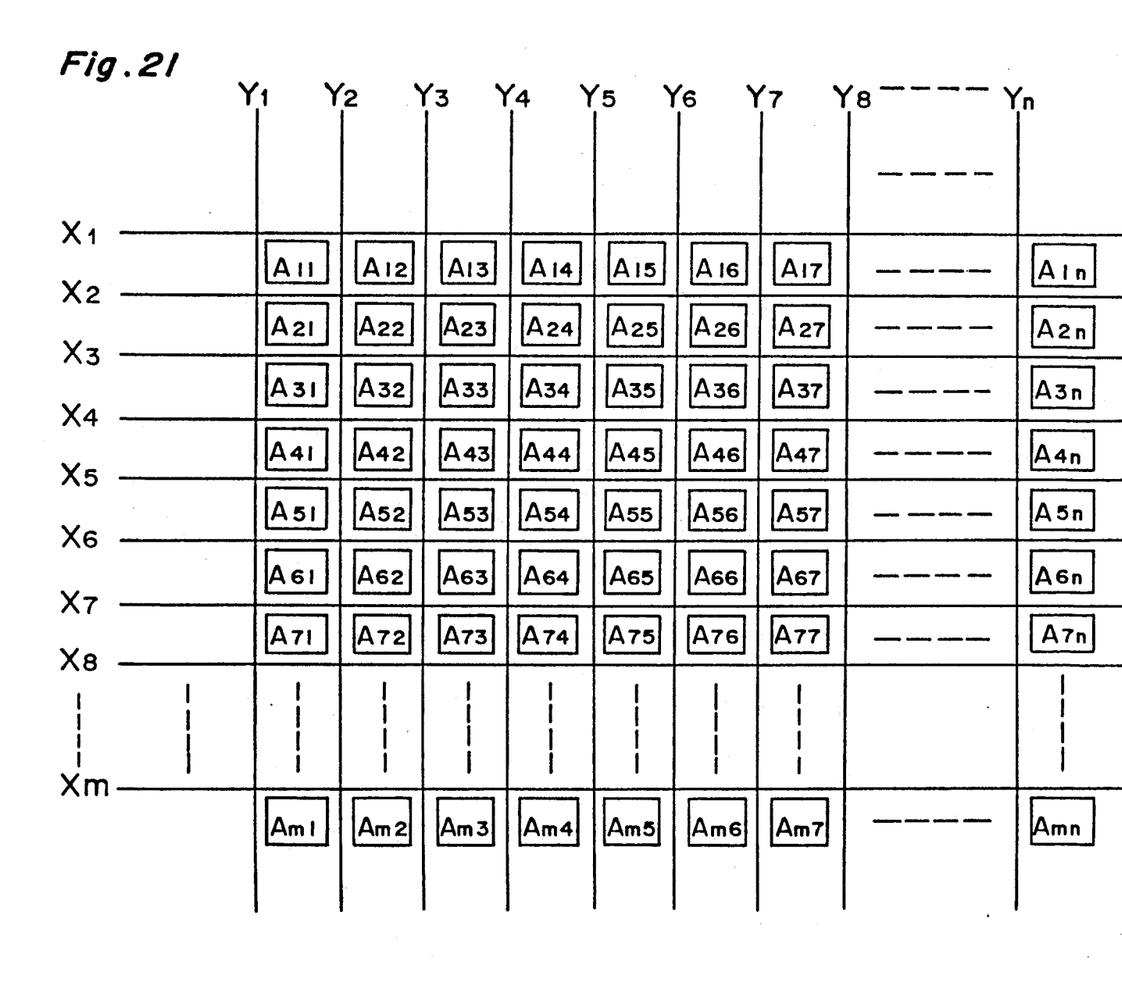
FIG. 21 is a schematic plan view showing an active matrix substrate.

FIG. 20 shows a structure of layers cross-sectioned along II—II line of FIG. 1.

As disclosed above, various redundant structures are provided to avoid possible image defects caused by breaks of bus lines and inoperative transistors.

Thus, the present invention is able to provide an active matrix substrate which is stable in operation thereof.

The preferred embodiments described herein are illustrative and not restrictive, the scope of the invention being indicated by the appended claims and all variations which come within the meanings of the claims are intended to be embraced herein.

What is claimed is:

1. A liquid crystal display device comprising:
a transparent insulating substrate;
a plurality of gate bus lines formed in parallel on a surface of said substrate;
a plurality of source bus lines formed in parallel so as to cross said plurality of gate bus lines, wherein each source bus line is insulated from each gate bus line at the respective crossings;
a plurality of transparent picture element electrodes, each of which is formed at a crossing of the gate bus lines and source bus lines; and
a plurality of switching means, each for connecting a picture element electrode to a corresponding source and gate bus line,
each of the plurality of source bus lines including a source bypass bus line, formed only at each crossing with the gate bus lines, thereby forming a pair of source bus lines crossing each gate bus line.

2. The liquid crystal display device of claim 1, wherein each said gate bus line includes a bypass bus line as a redundant structure, said bypass bus line being terminated prior to said gate and source bus line crossing, thereby forming a pair of gate buslines between adjacent source bus lines.

3. The liquid crystal display device of claim 2, wherein each said gate bus line is formed of a double layered, thickness structure, at least in the area in which said bypass line is formed.

4. The liquid crystal display device of claim 1, wherein each said source bus line is formed of a double layered thickness structure, except in the crossing zone thereof with said gate bus line.

5. The liquid crystal display device of claim 1, wherein each of said plurality of switching means includes a plurality of thin film transistors connected in parallel between a common source bus line and a picture element electrode so as to form a plurality of redundant structures and further connected to a common gate line, extended from said gate bus line and formed parallel to said source bus line.

6. The liquid crystal display device of claim 5, wherein said plurality of thin film transistors equals two.

7. A liquid crystal display device comprising:
a transparent insulating substrate;
a plurality of gate bus lines formed in parallel on a surface of said substrate;
a plurality of source bus lines formed in parallel so as to cross said plurality of gate bus lines, wherein each source bus line is insulated from each gate line at the respective crossing and includes a source bypass bus line, formed only at each crossing with the gate bus lines, thereby forming a pair of source bus lines crossing each gate bus line;
a plurality of transparent picture element electrodes, each of which is formed of a crossing of the gate bus lines and source bus lines, each being connected to only one gate bus line and only one source bus line; and
a plurality of switching means including a plurality of thin film transistors, in parallel, each connecting each said picture element to its corresponding only one source bus line;
each of said gate bus line including a bypass bus line as a redundant structure, said bypass bus line being terminated prior to said gate and source bus line crossing, thereby forming a pair of gate bus lines between adjacent source bus lines.

8. The liquid crystal display device of claim 7, wherein each of said plurality of thin film transistors of each said switching means, are further connected to a common gate electrode, extended from a gate bus line and formed parallel to a source bus line.

9. The liquid crystal display device of claim 8, wherein each said gate bus line includes a bypass bus line as a redundant structure, said bypass bus line being terminated prior to said gate and source bus line crossing, thereby forming a pair of gate bus lines between adjacent source bus lines.

10. The liquid crystal display device of claim 9, wherein each said gate bus line is formed of a double layered thickness structure, at least in the area in which said bypass line is formed.

11. The liquid crystal display of claim 7, wherein each said source bus line is formed of a double layered thickness structure except in the crossing zone thereof with said gate bus line.

12. The liquid crystal display device of claim 8, wherein the plurality of thin film transistors equals two.

13. The liquid crystal display device comprising:
a transparent insulating substrate;
a plurality of gate bus lines formed in parallel on a surface of said substrate;
a plurality of source bus lines formed in parallel so as to cross said plurality of gate bus lines, wherein each source bus line is insulated from each gate bus line at the respective crossing;

a plurality of transparent picture element electrodes, each of which is formed of a crossing of the gate bus lines and source bus lines, each being connected to only one gate bus line and only one source bus line; and a plurality of switching means, each for connecting a picture element electrode to a corresponding source and gate bus line, each of said plurality of switching means including a plurality of thin film transistors, in parallel, each connecting each said picture element to its corresponding only one source bus line and each of the plurality of thin film transistors further connected to a common gate electrode extended from a gate bus line and formed parallel to the source bus line;

each of said gate bus lines including a bypass bus line as a redundant structure, said bypass bus line being terminated prior to said gate and source bus line crossing, thereby forming a pair of gate bus lines between adjacent source bus lines.

14. The liquid crystal display device of claim 13 wherein each said gate bus line is formed of a double layered thickness structure, at least in the area in which said bypass line is formed.

15. The liquid crystal display of claim 13, where each of the plurality of source bus lines include a source bypass bus line, formed only at each crossing with the gate bus lines, thereby forming a pair of source bus lines crossing each gate bus line.

16. The liquid crystal display of claim 13, wherein each said source bus line is formed of a double layered thickness structure except in the crossing zone thereof with said gate bus line.

17. The liquid crystal display device of claim 13, wherein the plurality of thin film transistors equals two.

* * * * *